United States Patent [19]

Bliemeister

[11] 4,209,175
[45] Jun. 24, 1980

[54] ARTICULATED SEAL FOR ROTATING CYLINDER SUCH AS KILN OR THE LIKE

[75] Inventor: Robert M. Bliemeister, Milwaukee, Wis.

[73] Assignee: Allis-Chalmers Corporation, Milwaukee, Wis.

[21] Appl. No.: 10,675

[22] Filed: Feb. 9, 1979

[51] Int. Cl.² ............................................. F16J 15/38
[52] U.S. Cl. ..................................... 277/84; 277/199; 277/154; 432/73
[58] Field of Search ................ 277/84, 95, 143, 148, 277/151, 154, 155, 199; 110/246; 432/73; 431/115

[56] References Cited

U.S. PATENT DOCUMENTS

| | | | |
|---|---|---|---|
| 2,196,245 | 4/1940 | Borch | 432/73 |
| 2,638,363 | 5/1953 | Bryant | 277/154 X |
| 2,765,150 | 10/1956 | Persson et al. | 277/84 X |
| 3,042,389 | 7/1962 | Gieskieng | 277/84 |
| 3,337,224 | 8/1967 | Eser et al. | 277/154 X |
| 3,360,275 | 12/1967 | McCreary | 277/84 |
| 3,532,330 | 10/1970 | Sevanson | 432/73 |
| 3,997,175 | 12/1976 | Geary | 277/84 X |
| 4,149,731 | 4/1979 | Yoshida et al. | 277/199 X |

Primary Examiner—Robert S. Ward, Jr.
Attorney, Agent, or Firm—Robert C. Sullivan; Arthur M. Streich

[57] ABSTRACT

A seal for use in sealing an annular opening between a stationary member and a rotating cylinder telescopically arranged in the stationary member, the seal comprising an annular ring member circumscribing the cylinder adjacent the stationary member and closing the annular opening. The seal comprises weighting means extending axially away from a back side of the ring member to provide a counterweighting effect which causes a tilting of the ring member, whereby said tilting and the rotation of the cylinder moves the ring member into engagement with the stationary member to substantially seal the annular opening, all in accordance with the teaching of U.S. Pat. No. 3,042,389. In accordance with the present invention, the annular ring member is divided into a plurality of circumferentially extending segments in which adjacent segments are pivotally connected to each other to permit articulation of the segments to accommodate "out-of-round" portions of the rotating cylinder.

2 Claims, 8 Drawing Figures

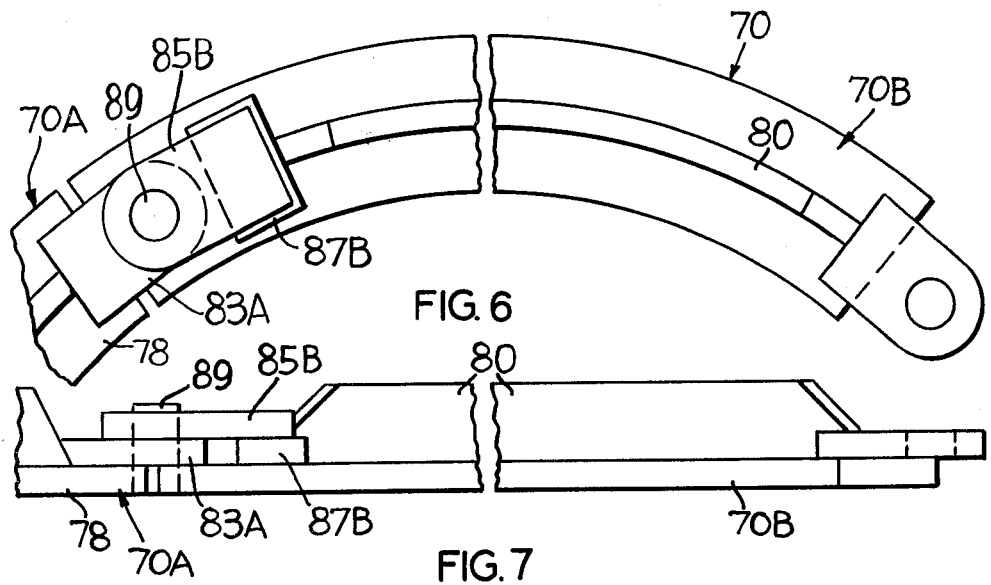
FIG. 6
FIG. 7
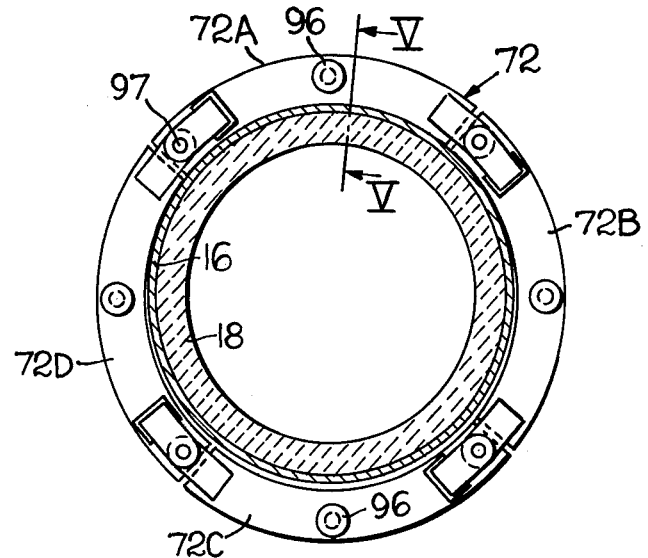
FIG. 8

ARTICULATED SEAL FOR ROTATING CYLINDER SUCH AS KILN OR THE LIKE

TECHNICAL FIELD

This invention relates to air or gas sealing arrangements for rotating cylinders such as rotary kilns or the like, whereby the ingress and egress of diluent and contaminating gaseous fluids at the ends of the rotating cylinder are significantly reduced by the sealing arrangement.

The sealing arrangement of the present invention is an improvement over the sealing arrangement shown by U.S. Pat. No. 3,042,389 issued to David H. Gieskieng on July 3, 1962.

DESCRIPTION OF THE PRIOR ART

It is known in the prior art as taught by the aforementioned U.S. Pat. No. 3,042,389 of David H. Gieskieng to provide a self-counterweighted sealing ring for sealing the annular clearance space between a rotating cylinder such as a rotary kiln and a stationary structure such as a feed housing at one end of the rotating kiln or a firing hood at the opposite end of the rotating kiln, with respect to which the rotary cylinder rotates. The self-counterweighted annular seal of the aforementioned U.S. Pat. No. 3,042,389 has a self-counterweighted construction such that the center of gravity of the annular seal lies in a plane normal to the axis of rotation of the rotary cylinder which is axially displaced from the plane, also normal to the axis of rotation of the cylinder, in which the annular sealing ring contacts the outer surface of the kiln. This construction results in the creation of a force moment arm which causes the annular sealing ring to be continuously tilted into sealing engagement with the associated stationary structure, such as the stationary feed end housing at one end or the stationary firing hood at the opposite end of the rotating kiln. The seal construction just described substantially prevents leakage of gaseous fluid through the annular clearance space between the rotating cylinder and the stationary structures at the respective opposite ends of the rotating cylinder.

STATEMENT OF THE INVENTION

It is an object of the invention to provide in an annular seal for rotating cylinders of the type shown by the aforementioned U.S. Pat. No. 3,042,389 a plurality of circumferentially extending seal segments which are pivotally jointed to permit articulation of the joined segments in a plane perpendicular to the axis of the rotating cylinder to accommodate "out-of-round" portions of the circumference of the cylinder during relative rotary movement between the annular seal and the rotating cylinder.

In achievement of these objectives, there is provided in accordance with the invention a seal for use in sealing an annular opening between a stationary member and a rotating cylinder which is telescopically arranged in said stationary member, said seal comprising an annular ring member circumscribing said cylinder adjacent said stationary member and closing said annular opening, wherein the improvement comprises having said annular ring member formed of a plurality of circumferentially extending ring segments, with circumferentially contiguous segments being pivotally connected to each other whereby contiguous segments may articulate with respect to each other to accommodate "out-of-round" places on the outer periphery of said rotating cylinder.

Further objects and advantages of the invention will become apparent from the following description taken in conjunction with the accompanying drawings in which:

BRIEF DESCRIPTION OF THE DRAWINGS

FIG. 6 is an enlarged detailed view of one of the segments of the annular sealing ring of the type shown in FIG. 2, and showing the pivotal connection of the segment to an adjacent segment;

FIG. 7 is a fragmentary edge view of the sealing ring segments of FIG. 6; and

FIG. 8 is a sectional view taken along line VIII—VIII of FIG. 1 to show the annular sealing ring contiguous the firing hood end of the kiln, with details of the kiln being omitted for purposes of clarity.

DESCRIPTION OF THE PREFERRED EMBODIMENT

Figure 1:
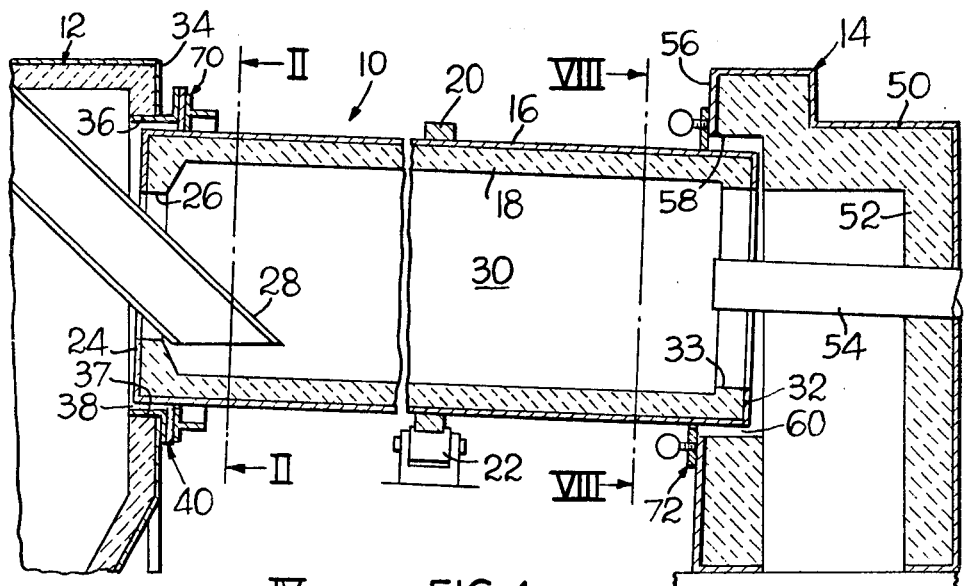
FIG. 1 is a side elevation view partially in section of a rotary kiln embodying the present invention.

Referring now to the drawings, and more particularly to FIG. 1, there is shown a rotary kiln generally indicated at 10 which inclines slightly downwardly from a feed end housing 12 to a firing hood 14 to assist in the movement of material through the kiln from the feed end 12 to the firing hood 14. Kiln 10 comprises a tubular or cylindrical shell 16 having an internal lining 18 formed of a suitable refractory material such as, for example, refractory bricks. A plurality of riding rings 20, only one of which is shown in the drawings, is disposed circumferentially about shell 16 and is supported on suitable carrying rollers 22. Suitable drive means (not shown) are provided, such as, for example, a motor driven ring gear circumferentially mounted about shell 16, for rotating kiln shell 16 about its longitudinal axis. Such a drive means is shown, for example, by U.S. Pat. No. 3,511,093, issued to Eugene B. Cook on May 12, 1970.

At one end of the tubular shell 16 an annular end plate 24 is secured and defines a substantially circular feed opening 26 through which a feed material, either dry or as a slurry, is fed from a chute 28 interconnecting kiln chamber 30 and a suitable storage facility (not shown).

Another annular end plate 32 is secured to the opposite end of shell 16 and defines a substantially circular discharge opening 33 through which the material, after treatment in the kiln, is discharged to conveyors, coolers, or the like depending upon the type of processing required for the material being treated.

At the feed end of the kiln, chute 28 is supported within the feed end housing 12 which has a front wall 34 in which is defined an opening 36. Opening 36 preferably corresponds generally to the shape of cylindrical shell 16 but is intentionally larger to provide for the telescopic arrangement of kiln shell 16 within housing 12 as shown. The dimensional difference between opening 36 and the outer diameter of shell 16 defines an annulus 38 which permits slight distortion of kiln shell 16 during operation without binding between kiln shell 16 and feed housing 12. The peripheral surface 37 in wall 34 which defines opening 36 in wall 34 is provided with a collar member generally indicated at 40 and best seen in FIG. 4, including an annular portion 42 which lines the peripheral surface 37 in front wall 34 and is concentric about a horizontal axis, the annular portion 42 extending beyond the inner face of wall portion 34 and terminating in a peripherally extending flange portion 44 which lies in a plane perpendicular to the axis of rotation of kiln 16, and thus lies in a plane which is slightly inclined relative to front wall 34 of feed housing 12. A circumferentially extending wear plate 45 is suitably secured to the axially inner surface of flange 44.

Figure 4:
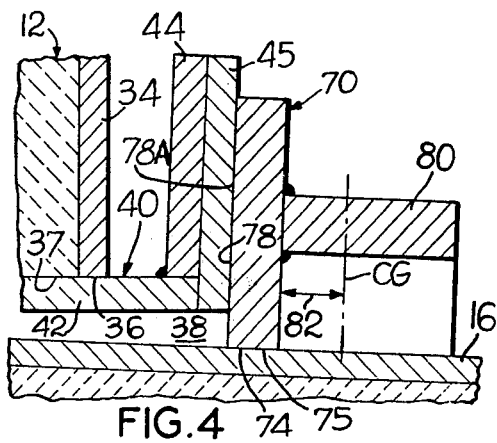
FIG. 4 is an enlarged fragmentary section taken along line IV—IV of FIG. 2.

Instead of having annular portion 42 of collar member 40 line annular peripheral surface 37 of front wall 34 as hereinbefore described and shown in FIGS. 1 and 4, annular portion 42 could instead be secured as by welding directly to the axially inner surface of front wall 34, with annular portion 42 not extending inside wall 34. Also, instead of having front wall 34 perpendicular to the horizontal axis as shown in FIGS. 1 and 4, front wall 34 instead could be normal to the kiln axis of rotation, in which case collar 40 could be eliminated and annular seal 70 could bear directly against the surface of wall 34 or against a wear plate similar to wear plate 45 which might be secured to wall 34.

Adjacent the discharge end of kiln 10 firing hood 14 comprises a housing 50 having a lining 52 formed of a suitable refractory material. Firing hood 14 contains a conventional burner 54 through which is fed the mixture of fuel and oxygen designed for the specific process to be employed in the kiln.

Firing hood housing 50 includes a front wall 56 having defined therein an opening 58 (similar to opening 36 in feed end housing wall 34) which circumscribes the outer periphery of kiln shell 16 to define an annulus 60 therebetween. Wall 56 is normal to the axis of rotation of kiln 10. The portion of hood front wall 56 extending radially away from opening 58 defines a bearing surface for annular sealing ring 72. Due to the very high temperature conditions at the contiguous firing hood 14, it is generally not advisable to provide firing hood 14 with a separate bearing collar member such as the collar member 40 carried by feed end housing 12 and having the bearing flange 44 and wear plate 45.

As shown in FIG. 1, annular sealing rings, each respectively generally indicated at 70 and 72, are provided in circumscribing relationship to kiln shell 16 for respectively closing annulus 38 between kiln cylinder 16 and feed end housing 12 and for closing annulus 60 between kiln cylinder 16 and firing hood 14.

Sealing ring 70 (see FIGS. 1, 2 and 4) comprises an axially extending annular inner surface 74 having a cylinder-engaging portion 75 which seats or "hangs" with loose contact on the upper surface of kiln shell 16 but with the annular surface 74 of sealing ring 70 being spaced below and having a small clearance with respect to the outer peripheral surface of kiln shell 16 at the lower surface of kiln shell 16. Annular sealing ring 70 also includes an annular sealing portion 78 which includes a sealing surface 78A extending radially outwardly from inner surface 74. Annular sealing portion 78 and sealing surface 78A thereof serve to close annulus 38 between front wall 34 of feed end housing 12 and the outer periphery of kiln shell 16. Annular sealing ring 70 also includes a weighting portion 80 in the form of an annular member which is fixed as by welding to a radially intermediate portion of annular sealing portion 78 of seal member 70. Weighting portion 80 extends away from sealing portion 78 in a direction which is substantially parallel to the axis of rotation of kiln cylinder 16, whereby to cause the center of gravity CG (FIG. 3) of sealing ring 70 to be axially offset from the geometric center of annular sealing portion 78. Weighting portion 80 coacts with cylinder engaging portion 75 of seal member 70 to define a moment arm 82 therewith.

Another form of annular sealing ring 72 is shown in circumscribing relation to kiln cylinder 16 at the contiguous firing hood 14. Any of the various forms of annular sealing rings described in this specification could be interchangeably used at either end of kiln cylinder 16.

Figure 5:
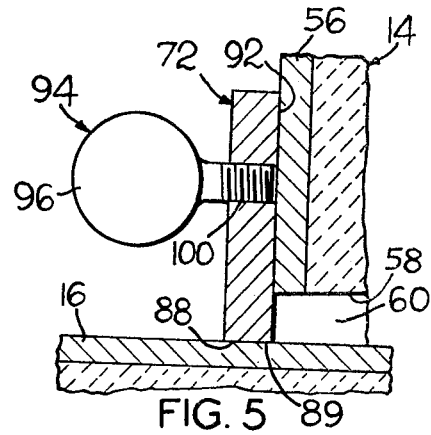
FIG. 5 is an enlarged fragmentary section taken along line V—V of FIG. 8.

Sealing ring 72, as seen in FIGS. 1, 5 and 8, comprises an axially extending annular inner surface 88 having a cylinder engaging portion 89 which "hangs" with loose contact on the upper surface of kiln cylinder 16 in the same manner as described in connection with annular sealing ring 70. Annular inner surface 88 has a small clearance with respect to the lower surface of kiln shell 16. Sealing ring 72 also comprises an annular sealing portion 92 which extends radially from inner surface 88 of sealing ring 72 and engages bearing surface 56 of firing hood 14 to close annulus 60. Ring 72 also includes a weighting portion generally indicated at 94 and comprising a plurality of independent discrete weight members 96 secured to annular sealing portion 92 in peripherally spaced relation to each other to form an integral structure with annular sealing portion 92 in which the center of gravity of sealing ring 72 is axially offset from the geometric center of annular sealing portion 92. The symmetrically disposed discrete weight means 96 may be secured to annular sealing portion 92 in any suitable manner such as by means of a threaded engagement as shown at 100 in FIG. 5; or, alternatively, weight means 96 may be welded to annular sealing portion 92.

Still another embodiment of annular sealing ring which might be used would be similar to that shown in FIG. 5 of the aforementioned U.S. Pat. No. 3,042,389 in which the annular weighting portion extends from the radially outer end of the annular sealing member rather than from the radially intermediate portion of the annular sealing member.

Any of the various sealing rings described herein should have sufficient clearance with respect to the outer diameter of kiln shell 16 to permit the seal to "walk" along the kiln shell into sealing engagement with the corresponding annulus 38 or 60.

In order to permit the annular sealing rings 70, 72 to deform with an out-of-round kiln shell 16, each of the annular sealing rings such as 70 and 72 is formed in a plurality of pivotally connected segments which permit articulation of the pivotally joined segments of the sealing ring in a plane perpendicular to the axis of rotation of the kiln. The annular sealing ring should include at least three pivotally connected circumferential segments, although the embodiments of the invention shown in the drawings each includes four pivotally connected segments each of which extends circumferentially for substantially 90°. This articulated construction of the annular seal members permits the inside diameter of the sealing ring to deform to substantially conform to a misshapen or "out-of-round" shell 16 and, at the same time, permits the annular sealing ring to remain free to move axially on the shell. Such capability of axial movement of the annular sealing ring is important during the dynamics of kiln rotation to permit each annular seal to have any axial movement necessary to accommodate itself into proper sealing relation with the corresponding annulus which it seals, such as the annulus 38 which is closed by annular seal 70 in FIG. 1 and the annulus 60 which is closed by annular seal 72 of FIG. 1.

Figure 2:
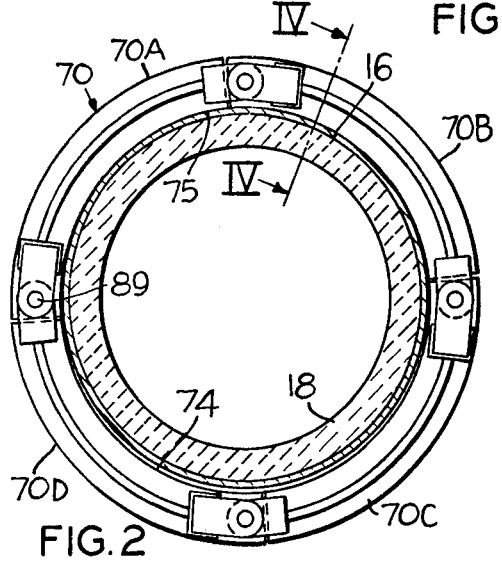
FIG. 2 is a sectional view taken along line II—II of FIG. 1 to show the annular sealing ring contiguous the feed end of the kiln, with details of the kiln being omitted for purposes of clarity.
Figure 3:
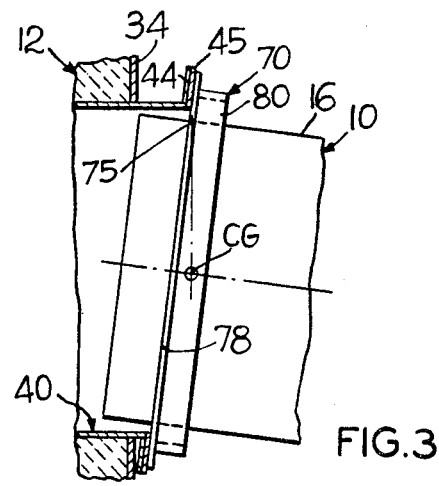
FIG. 3 is an enlarged detail view, somewhat exaggerated for purposes of clarity, showing the relationship of the annular sealing ring 70 of FIG. 1 to the rotary kiln and to the stationary bearing collar at the feed end of the kiln, with the angle of inclination of the kiln being exaggerated in order to more clearly show the relationship of the various members.

Referring to FIG. 2, it can be seen that the annular seal generally indicated at 70 is made up of a plurality of circumferential segments respectively indicated at 70A, 70B, 70C and 70D, each of which extends substantially 90° of the periphery of kiln cylinder 16.

Referring to FIGS. 2, 6 and 7 which show the pivotal connection between two segments 70A and 70B of annular sealing ring 70, it can be seen that segment 70A is provided in the region of its pivotal connection to segment 70B with a tongue-like portion 83A which is suitably secured to the axially inner surface of sealing ring portion 78 of segment 70A (with respect to the installed position of seal 70 shown in FIG. 1), tongue-like portion 83A extending in overlapping relation to sealing ring portion 78 of the contiguous segment 70B. Seal segment 70B is provided with a cooperating tongue portion 85B which is suitably secured to a spacer member 87B which in turn is fixed to the axially inner surface of annular sealing portion 78 of segment 70B. Tongue portion 85B on sealing ring segment 70B is so positioned by means of spacer member 87B that the tongue portion 85B overlies with respect to the view in FIGS. 2 and 7, the cooperating tongue portion 83A of seal segment 70A. A pin member 89 is received in suitable passages in tongue portion 85B of seal segment 70B, through tongue portion 83A of the seal segment 70A and through sealing portion 78 of segment 70B, whereby to pivotally secure the two seal segments 70A and 70B together whereby segments 70A, 70B may articulate with respect to each other as required by variations in the outer diameter of kiln cylinder shell 16 during the rotation of the kiln, as might be caused by a misshapen or "out-of-round" shell.

In the operation of the rotary kiln 10 of FIG. 1, the counterweighted construction of sealing rings 70 and 72 causes sealing ring 70 to "walk" into sealing engagement with bearing surface 45 at the feed end of the kiln, and causes sealing ring 72 to "walk" into engagement with bearing surface 56 of firing hood 14 at the discharge end of the kiln to substantially prevent ingress and egress of gases through the annular openings 38 and 60, all in the manner described in the aforementioned U.S. Pat. No. 3,042,889 of David H. Gieskieng.

Also, sealing rings 70 and 72 described hereinbefore and shown in the drawings provide a pivotal connection between contiguous circumferential segments of the annular sealing ring to permit the sealing ring to have an articulating movement to accommodate the sealing ring to "out-of-round" spots on the outer surface of the rotating cylinder, such as kiln shell 16.

Each of the annular seals hereinbefore described should preferably be rigid in a plane parallel to the surface against which it seals, such as flange 44 and wear plate 45 at the feed end of kiln 10, or front wall 56 at the discharge end of the kiln.

While the annular seal of the invention has been described as used with a rotary kiln, it can also be used in connection with rotating cylinders used as rotary coolers, rotary dryers or the like.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A seal for use in sealing an annular opening between a stationary member and a rotating cylinder which is telescopically arranged in said stationary member, said seal comprising an annular ring member circumscribing said cylinder adjacent said stationary member and closing said annular opening, wherein the improvement comprises having said annular ring member formed of a plurality of circumferentially extending ring segments, with circumferentially contiguous segments being pivotally connected to each other whereby contiguous segments may articulate with respect to each other to accommodate "out-of-round" places on the outer periphery of said rotating cylinder.

2. A seal for use in sealing an annular opening between a stationary member and a rotating cylinder which is telescopically arranged in said stationary member, said seal comprising an annular ring member circumscribing said cylinder adjacent said stationary member and closing said annular opening, said seal comprising a narrow inner circular edge portion adapted to rest on and make loose contact with the outer periphery of said cylinder and having a flat annular surface extending radially outwardly from said edge portion and adapted to engage said stationary member and to close said annular opening, said seal being adapted for free axial movement along the outer periphery of said cylinder, said seal comprising weighting means extending axially away from a back side of said ring opposite said annular surface, said weighting means extending from a location on said back side that is radially outward of said inner edge portion and providing together with the weight of said ring a center of mass axially backward of said edge portion for tilting said ring whereupon said tilting and the rotation of said cylinder moves said ring member into engagement with said stationary member to substantially seal said annular opening, wherein the improvement comprises having said annular ring member formed of a plurality of circumferentially extending ring segments, with circumferentially contiguous segments being pivotally connected to each other whereby contiguous segments may articulate with respect to each other to accommodate "out-of-round" places on the outer periphery of said rotating cylinder.

* * * * *